US008428944B2

(12) United States Patent
Poultney et al.

(10) Patent No.: US 8,428,944 B2
(45) Date of Patent: Apr. 23, 2013

(54) SYSTEM AND METHOD FOR PERFORMING COMPENSATED SPEECH RECOGNITION

(75) Inventors: Timothy David Poultney, Winchester (GB); Matthew Whitbourne, Hants (GB); Kamourudeen Larry Yusuf, Eastleigh (GB)

(73) Assignee: Nuance Communications, Inc., Burlington, MA (US)

( * ) Notice: Subject to any disclaimer, the term of this patent is extended or adjusted under 35 U.S.C. 154(b) by 1433 days.

(21) Appl. No.: 11/745,029

(22) Filed: May 7, 2007

(65) Prior Publication Data

US 2008/0059167 A1 Mar. 6, 2008

(30) Foreign Application Priority Data

Aug. 12, 2006 (GB) .................................. 0616070.9

(51) Int. Cl.
*G10L 15/00* (2006.01)
*G10L 17/00* (2006.01)
*G10L 15/28* (2006.01)
*G10L 21/00* (2006.01)

(52) U.S. Cl.
USPC ............ 704/231; 704/246; 704/255; 704/273

(58) Field of Classification Search .................. 704/233, 704/231, 246, 255, 273; 395/2.55
See application file for complete search history.

(56) References Cited

U.S. PATENT DOCUMENTS

| 6,308,153 | B1 * | 10/2001 | Huang et al. .................. 704/246 |
| 6,671,669 | B1 * | 12/2003 | Garudadri et al. ............ 704/255 |
| 6,751,591 | B1 | 6/2004 | Gorin et al. |
| 6,754,629 | B1 * | 6/2004 | Qi et al. ........................ 704/246 |
| 7,536,304 | B2 * | 5/2009 | Di Mambro et al. ......... 704/273 |
| 2003/0130849 | A1 | 7/2003 | Durston et al. |
| 2006/0178879 | A1 * | 8/2006 | Murveit et al. ............... 704/231 |

OTHER PUBLICATIONS

Speech Recognition: Handling Error Recognition and Repair; http://www.w3.org/TR/voicem120.

* cited by examiner

*Primary Examiner* — James S. Wozniak
*Assistant Examiner* — Farzad Kazeminezhad
(74) *Attorney, Agent, or Firm* — Wolf, Greenfield & Sacks, P.C.

(57) ABSTRACT

A speech recognition system prompts a user to provide a first utterance, which is recorded. Speech recognition is performed on the first user utterance to yield a recognition result. The user is prompted to provide a second user utterance, which is recorded, processed and compared to the first utterance to detect a plurality of acoustic differences for each acoustic parameter. The acoustic model used by the speech recognition engine is modified as a function of the acoustic difference.

19 Claims, 3 Drawing Sheets

SYSTEM AND METHOD FOR PERFORMING COMPENSATED SPEECH RECOGNITION

TECHNICAL FIELD

This invention related to speech recognition feedback. In particular this invention relates to feedback of misrecognized speech to improve an automatic speech recognition system.

BACKGROUND

In an interactive voice response (IVR) system using automatic speech recognition (ASR) it is common for callers to speak to the system in the same way they would speak to another human being. This becomes a problem for ASR when the user is asked to repeat information they have already given. It has been observed that certain traits are exhibited when one is repeating oneself; for instance, speaking slower or faster; increasing or decreasing pitch; increasing volume; hyper-stressing key phonemes; and emphasising syllabic breaks. These traits are problematic for ASR as the traits move the speech further away from the normalized speech models and algorithms on which the recognition engine is based.

U.S. Pat. No. 6,751,591 discloses a method and system for an ASR dialog system. If a user's input communication cannot be understood, a probability of understanding the user's input communication is derived from the ASR data. If the probability exceeds a first threshold then the dialog strategy is adapted according to the ASR data and the dialog with the user is extended. If the results of the extended dialog cannot be understood, then the adapted dialog strategy is further adapted, based on the ASR data from both the original dialog and the extended dialog.

Another known solution that attempts to improve recognition re-prompts a user to speak in a normal voice. However this solution does not take into account that the user may have already spoken in their "normal" voice and that the ASR engine may simply have trouble recognizing them. Also, asking a user to use their "normal" voice makes that user self-conscious of how they speak and cause them to distort what is really their normal voice as they try to comply.

It would be advantageous to find a way of using repeated utterances to improve the accuracy of speech recognition.

SUMMARY OF INVENTION

According to a first aspect of the present invention there is provided a method of speech recognition comprising: prompting the user to speak; recording a first user utterance; performing speech recognition on the first user utterance and generating a recognition result; re-prompting the user; recording a second user utterance; processing the second utterance to detect at least one acoustic difference between the first and second user utterance; and performing compensated speech recognition on an utterance by compensating for the at least one acoustic difference.

This solution increases the probability the speech recognition engine will be able to recognize re-prompted utterances, while at the same time making the caller's experience more pleasant by allowing them to converse more naturally with the speech recognition engine. The solution assumes that the user is attempting to speak in a clearer way by varying his voice. This variation between the first and second utterance is analyzed and then applied when performing speech recognition.

Advantageously, the speech recognition system uses an acoustic model having adjustable parameters. An acoustic difference between the first and second utterances is matched to a corresponding adjustable parameter and the parameter is adjusted to reflect the difference. The adjustment in the parameter results in an adjustment in the acoustic model used by the speech recognition engine.

The solution is described in terms of an acoustic model but could equally be described in terms of a statistical algorithm. Many methods of speech recognition use statistical algorithms including: the Hidden Markov Model (HMM) method; neural network methods; and dynamic time warping (DTW) methods. Each of these approaches analyzes acoustic properties of an utterance using a set of statistical algorithms to find the nearest match between the acoustic properties of the utterance and acoustic properties of stored data. Each approach can determine the similarity between two input utterances in terms of acoustic parameters of its algorithms. Furthermore, each approach uses an adjustable or dynamic weighting system to weight the acoustic parameters used by the algorithms. It is this weighting that the present system seeks to change during the analysis of an utterance.

A speech recognition result preferably includes recognition test and a confidence value to represent the accuracy of the recognition. This confidence value can be checked against a threshold to determine if a further utterance is to be processed. The confidence value is advantageously used by a voice application to decide whether to use the recognition result.

More advantageously, a browser records the utterance and sends utterance data; prompt count; previous utterance reference to an automatic speech recognition engine (ASR). The ASR performs compensated speech recognition when the prompt count indicates that the utterance is a repeat utterance.

This aspect of sharing state information maintained in a voice application execution environment such as a browser with an ASR to enhance the probability of correctly recognizing a word or phrase is useful when the ASR does not normal save state information. The voice application execution environment is inherently aware of whether or not it re-prompts the caller, and also of how many times it has re-prompted the caller. In addition, a history of captured audio for misrecognized utterances and recognition metrics on a per session basis can be stored by the ASR engine.

In a variant of this aspect, the ASR may keep a continuous record of all recognition requests it has processed previously, allowing it to maintain its own state information and to provide its own comparison from one request to the next to detect re-prompting. The ASR would still need to receive information from the browser as the ASR engine has not concept of dialog scope. However, it is not efficient to have an ASR engine allocated per call, and therefore most solutions do not carry requests through to the same ASR system every time and therefore the conversational thread is not maintained.

According to a second aspect of the invention there is provided a speech recognition system comprising: prompting logic for prompting a user to speak an utterance; re-prompting logic for re-prompting the user to repeat the utterance; recording means for recording the first and second user utterances; a difference engine for processing the first and second utterance to identify at least one acoustic difference between a first and second user utterance; a speech recognition engine for performing speech recognition on one of the user utterances and generating a recognition result; and a compensating controller for modifying the operation of the speech recognition engine to reflect the acoustic difference.

The prompting logic, re-prompting logic, and recordings means are provided by a voice application instructing standard functionality in a telephony system. The difference engine, compensating controller and speech recognition engine are provided by an automatic speech recognition system.

DESCRIPTION OF DRAWINGS

Embodiments of the invention will now be described, by means of example only, with reference to the accompanying drawings in which.

DETAILED DESCRIPTION

Figure 1:
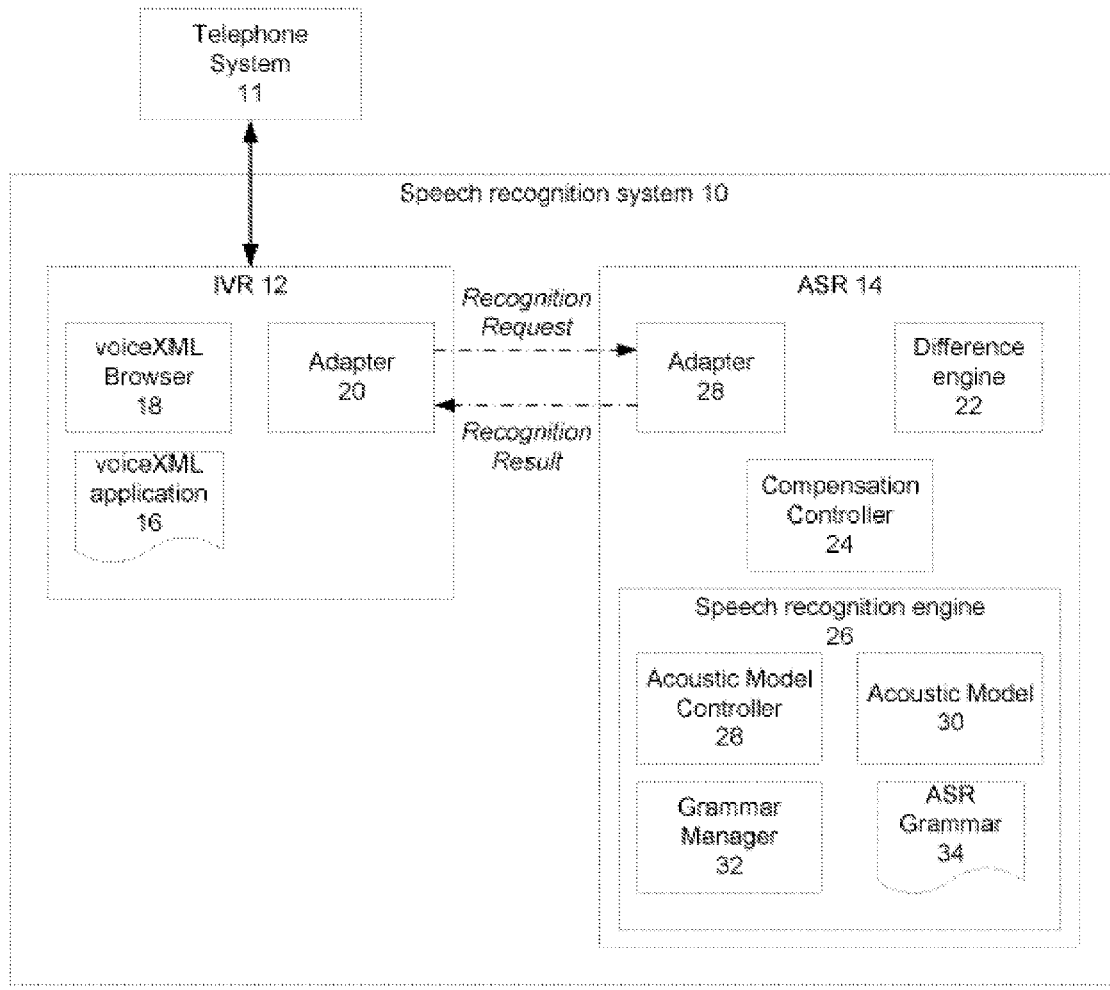
FIG. 1 is schematic of a speech recognition system according to the present embodiment.

A speech recognition system 10 according to the preferred embodiment comprises: an interactive voice response system (IVR) 12 for interacting with a user of a telephone system 11 and an automatic speech recognition system (ASR) 14 for performing speech recognition on user utterances.

The IVR 12 comprises a voiceXML application 16 for execution on a voiceXML browser 18 running on a telephony computer system. The IVR 12 communicates with the ASR 14 using packets of data transmitted between adapters 20 and 28 over a network. It is not essential that the application 16 be a voiceXML application. In other embodiments, the application might be written in Java or using a state table. In one embodiment, the telephony computer system is IBM WebSphere Voice Response v5.2 (formerly IBM DirectTalk) but other telephony systems can be used if adapted in accordance to this description.

The ASR 14 of the preferred embodiment comprises a speech difference engine 22; a compensation controller 24; a speech recognition engine 26; and an adapter 28.

The speech difference engine 22 processes first and second utterance from a user to identify an acoustic difference between them. The speech difference engine 22 then matches the acoustic difference to a corresponding adjustable parameter in an acoustic model. There may be multiple acoustic differences between two utterances; for example, the second utterance may be both louder and slower than the first utterance. In the preferred embodiment, the most pronounced acoustic difference in a set of differences is identified and matched. For more precision, in alternative embodiments, more than one acoustic difference is identified and matched to a corresponding acoustic parameter.

The compensation controller 24 alters the operation of the speech recognition engine to reflect the acoustic difference. The compensation controller 24 adjusts the operation of speech recognition engine 26 in accordance with the adjustable parameter corresponding to the acoustic difference.

The speech recognition engine 26 performs speech recognition on the user utterances and generates recognition results. In this embodiment the speech recognition engine comprises: an acoustic model controller 28; an acoustic model 30; a grammar manager 32; and a grammar 34. The acoustic model controller 28 and acoustic model 30 are used to perform statistical analysis on the speech utterance input. The acoustic model 30 comprises acoustic algorithms and root phonemes. The acoustic model controller 28 queries the data using the algorithms and adjusts the parameters to tune the search. The grammar 34 contains a word table (for instance of English words) to enable matching of each audible phoneme set (a spoken word) with a visual letter set (a written word).

In a preferred embodiment the speech recognition engine uses Hidden Markov Model (HMM) based speech recognition because the acoustic model 30 is tuneable. Other speech recognition techniques using statistical algorithms can be used; for instance, neural network based speech recognition or dynamic time warping (DTW) based speech recognition. Each of these approaches analyzes acoustic properties of an utterance using a set of statistical algorithms to find the nearest match between the acoustic properties of the utterance and acoustic properties of stored data. Each approach can determine the similarity between two input utterances in terms of acoustic parameters of its algorithms. Furthermore, each approach uses an adjustable or dynamic weighting system to establish the relative importance of each acoustic parameter used by the algorithms. It is these weightings that the present system seeks to change during the analysis of an utterance.

The recognition result comprises recognition test and a confidence value to represent the perceived accuracy of the recognition. The voiceXML application 16 checks this confidence value against a threshold to determine if a further utterance is to be processed.

In a preferred embodiment the speech recognition engine 26 performs compensated recognition on the utterance with the highest original confidence value. However, in another embodiment compensated recognition is performed on both the first and second utterance and the recognition result with the best confidence score is used.

The compensating speech recognition takes into account the acoustic difference by assuming the input utterance has an amplified or diminished acoustic difference.

The voice XML browser 18 together with the telephony system provide the base functionality for the voiceXML application 16. When the application 16 requests a prompt to be played, the voiceXML browser 18 uses the telephony system to play sound to the user down a telephone line. When the utterance is to be recorded, the browser 18 stores speech data from the telephone line and passes it to the application. If the application 16 requests that stored speech data to be recognized, then it is the browser 18 that makes the request of the ASR 14 and receives and stores the returned recognition result.

A recognition request packet sent to the ASR 14 comprises control information in a header part of the packet and utterance data in a data part of the packet. The control information comprises a prompt count and previous utterance references if appropriate. The ASR 14 saves all utterance data that it is sent and returns an utterance reference back in the response. This reference is used by the IVR 12 when it wants previous utterance to be considered in the analysis. This aspect of sharing state information maintained in a voice environment is useful as an ASR does not normally save state information. The voice application execution environment is aware of whether or not it re-prompts the caller, and also of how many times it has re-prompted the caller. The captured utterances are stored by the compensation controller 24 in a preferred embodiment. In an alternative embodiment the utterances are stored in a session history along with the recognition metrics. The ASR 28 receives dialog information from the browser session as the ASR 28 has no concept of session or dialog since it is not efficient to have an ASR engine allocated per call.

Figure 2:
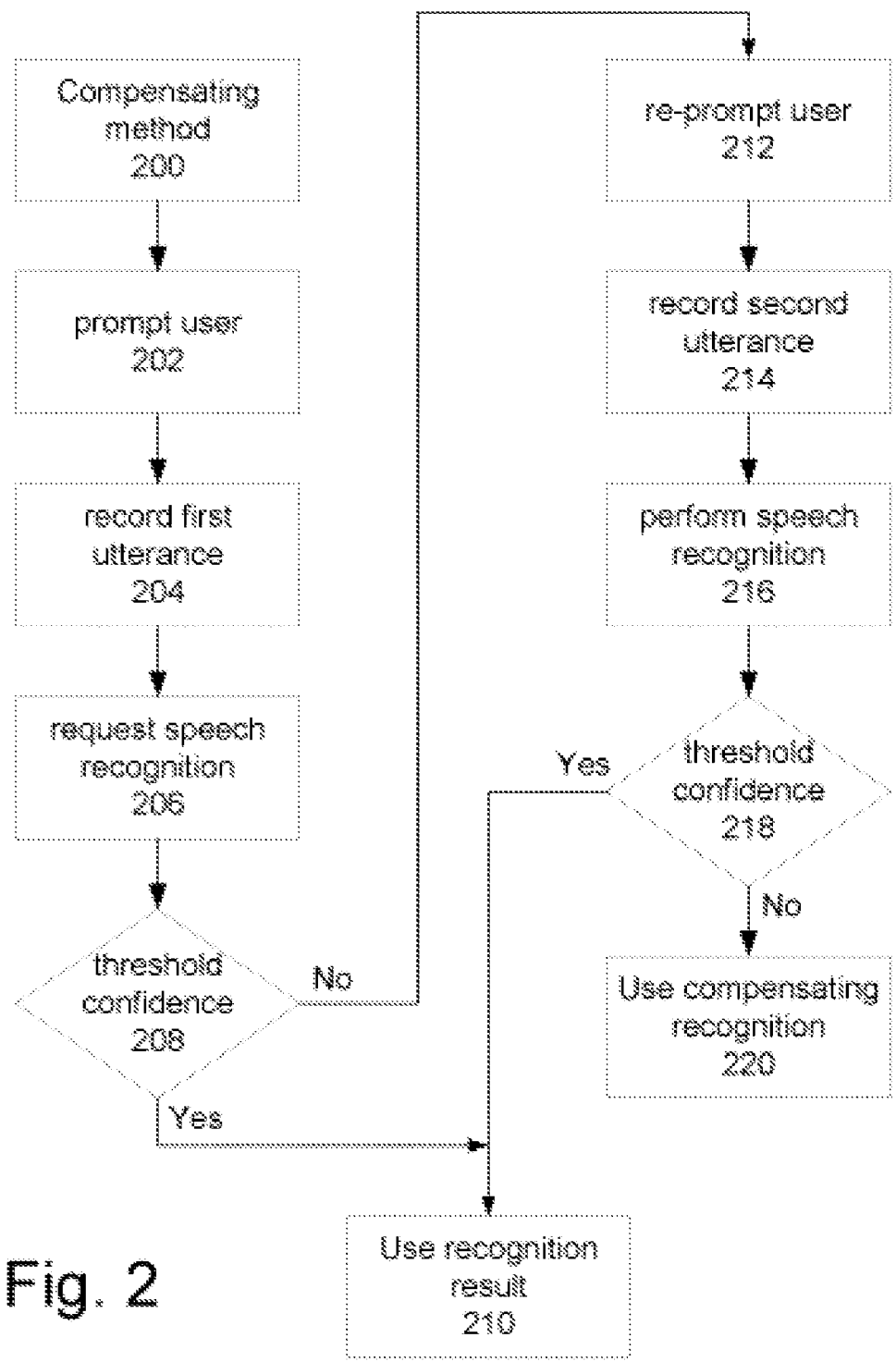
FIG. 2 is a flowchart of a method of a voice application according to the present invention.

One example of the voiceXML application is compensating method 200 shown in flow chart format in FIG. 2. This method controls the compensating ASR interaction.

A typical voice application prompts a user for an utterance, analyzes the utterance and then returns a recognition result. This method adapts this sequence to use compensating recognition. Typically a user will call the telephony system and start a session and the application will be initiated for the duration of the user session.

In step 202, the application prompts a user to speak an utterance; for example, a destination name.

In step 204, the application records an utterance over the phone line in the telephony system.

In step 206, the application requests speech recognition of the first utterance and gets back recognition results including the text of the utterance and a confidence value.

In step 208, the application checks whether the confidence value is acceptable; i.e, has met or exceeded a predetermined threshold). If an acceptable confidence value is returned, then, in step 210, the recognition result is used.

However, there will be times the confidence value is below the established threshold level. In this case the application, in step 212, re-prompts the user.

In step 214, a second utterance is recorded.

In step 216, a second request to perform speech recognition is made to the ASR 14 and recognition results are returned, including the text of the utterance and a confidence value. However, in another embodiment the process may request compensating recognition immediately and jump to a method to be described with reference to FIG. 3.

In step 218, the application checks that the confidence value is acceptable. If an acceptable level of confidence is returned then, in stop 210, the recognition result is used.

If there is insufficient confidence in the second recognition results then, in step 220, the application requests compensating recognition 222 from the ASR.

Figure 3:
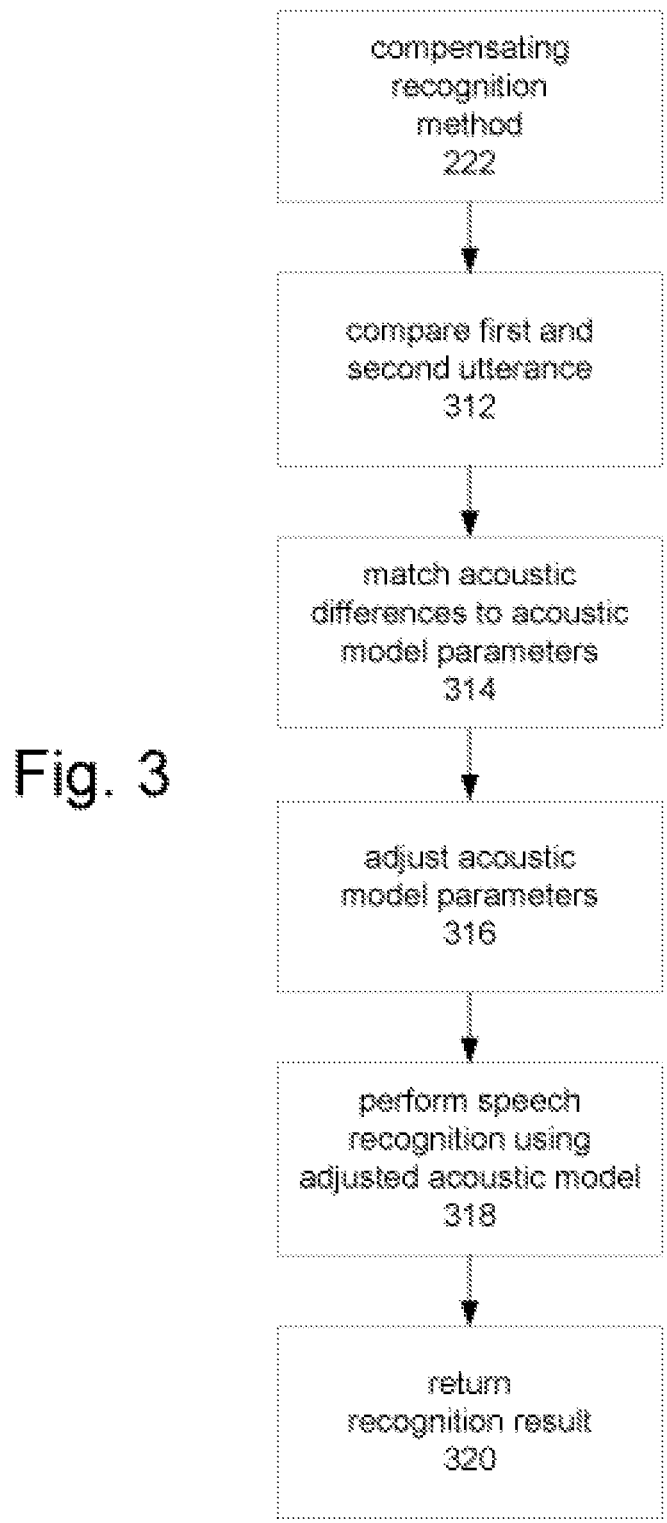
FIG. 3 is a flowchart of a method of an automatic speech recognition system according to the present invention.

The steps of the compensating recognition method 222 shown in FIG. 3 are performed by the ASR under the control of the compensation controller 24.

In step 312, the difference engine 22 compares the first and second utterances to identify at least one acoustic difference.

In step 314, the compensation controller 24 matches the at least one acoustic difference with parameters in the acoustic algorithm.

In step 316, the compensation controller 24 adjusts at least one parameter in the algorithm. In one embodiment the adjustment is made on a per request basis and there is no persistence. However, it could be arranged that the adjustment could persist on a per session basis or stored for reuse in future sessions with the same user.

In step 318, the speech recognition engine 26 performs speech recognition using the compensated algorithm.

And in step 320, the ASR 14 returns the compensated recognition result.

EXAMPLES

Scenario A Caller rings IVR to hear movie listings.
1. Caller prompted by IVR to say the city for the movie they would like to hear listings for.
2. Caller says 'Southampton'.
3. IVR sends request to ASR engine to recognize the caller's utterance.
4. A misrecognition occurs and the ASR engine returns the result.
5. IVR prompt count is increased and the caller is re-prompted to say the utterance again.
6. Caller says 'SOUTH-HAMP-TON'.
7. IVR sends request to ASR engine to performed compensated recognition and sets 'reprompt-count' header to "1".
8. ASR engine interprets that a re-prompt has occurred.
9. ASR engine adjusts acoustic model to account for caller characteristics.

Scenario B—Caller rings IVR to hear movie listing
1. Caller is prompted by IVR to say the city for the movie they would like to hear listings for.
2. Caller says 'Southampton'.
3. IVR sends request to ASR engine to recognise utterance with 'save-waveform' header set to "true".
4. A misrecognition occurs and the ASR engine returns the result.
5. a) IVR prompt count is increased and the caller is re-prompted to say the utterance again.
   b) URl list is updated to include the location of the unrecognized prompt.
6. Caller says 'SOUTH-HAMP-TON'.
7. IVR sends request to ASR engine to recognize utterance and sets 'reprompt-count' header to 1 and sends 'audio-history' URl list.
8. ASR engine interprets that a re-prompt has occurred and receives URl list.
9. ASR engine compares utterance to check they are the same phrase, and uses the audio source differences and re-prompt information to adjust acoustic model accordingly.

Scenario C—Scenario B has occurred
1. Having gone through scenario B an accurate recognition has now occurred.
2. The final prompt count for that turn is added to a session prompt collection.
3. The caller moves through conversation onto another prompt and exhibits the same behavior as scenario B above.
4. When the ASR request is sent, a metric in the form of a message header, for example 'Average-reprompts' is set and passed to ASR engine.
5. This time they are re-prompted a different number of times before a successful recognition occurs.
6. The prompt count for this turn is added to a session prompt collection.
7. The metric supplied to the ASR engine on each occasion is used to determine how successfully a caller is being recognized and allows adjustments to the acoustic model to be made based on their session record, current prompt count and audio history.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitable be carried out fully or partially in software running on one or more processors (not shown), and that the software may be provided as a computer program carried on any suitable data carrier (also not shown) such as a magnetic or optical computer disc. The channels for the transmission of data likewise may include storage media of all descriptions as well as signal carrying media, such as wired or wireless signal media.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

The present invention may suitably be embodied as a computer program product for use with a computer system. Such an implementation may comprise a series of computer readable instruction either fixed on a tangible medium, such as a computer readable medium, for example, diskette, CD-ROM, DVD, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer service on demand.

It will also be appreciated that various further modifications to be preferred embodiment described above will be apparent to a person of ordinary skill in the art.

The invention claimed is:

1. A method of speech recognition comprising:
    prompting a user to provide a first utterance comprising a phrase;
    recording the first user utterance;
    performing speech recognition on the first user utterance and generating a first recognition result using a speech recognition system, wherein the first recognition result comprises a first confidence value that represents an expected accuracy of the speech recognition on the first user utterance;
    in response to a determination that the first confidence value is less than a threshold value, re-prompting the user to provide a second utterance comprising the same phrase as the first utterance;
    recording the second user utterance;
    performing speech recognition on the second user utterance and generating a second recognition result using the speech recognition system, wherein the second recognition result comprises a second confidence value that represents an expected accuracy of the speech recognition on the second user utterance;
    in response to a determination that the second confidence value is less than a threshold value, detecting a plurality of acoustic differences between the first and second user utterances;
    compensating the speech recognition system by adjusting a plurality of adjustable parameters to compensate for the plurality of acoustic differences; and
    performing compensated speech recognition on the first and/or the second user utterances, wherein the performing compensated speech recognition comprises:
        performing speech recognition on a selected one of the first user utterance and the second user utterance and generating a compensated speech recognition result for the selected utterance using the compensated speech recognition system, wherein the first user utterance is selected when the first confidence value is higher than the second confidence value, and wherein the second user utterance is selected when the second confidence value is higher than the first confidence value; or
        performing speech recognition on the first user utterance to generate a first compensated result having a first compensated confidence value using the compensated speech recognition system, performing speech recognition on the second user utterance to generate a second compensated result having a second compensated confidence value using the compensated speech recognition system, selecting the first compensated result as the compensated speech recognition result when the first compensated confidence value is greater than the second compensated confidence value, and selecting the second compensated result as the compensated speech recognition result when the second compensated confidence value is greater than the first compensated confidence value.

2. A method according to claim 1 wherein compensated speech recognition is performed on both the first user utterance, resulting in a first compensated recognition result comprising a first confidence score, and the second user utterance, resulting in a second compensated recognition result comprising a second confidence score, and the compensated recognition result with the best confidence score is used.

3. A method according to claim 2 wherein the compensated speech recognition takes the acoustic difference into account by assuming the second user utterance has an amplified or diminished acoustic difference.

4. A method according to claim 3 wherein a browser records the first and second user utterances and sends utterance data, prompt count and a previous utterance reference to an automatic speech recognition engine (ASR) of the speech recognition system and the ASR performs compensated speech recognition when the prompt count indicates that the second user utterance is a repeat utterance.

5. A method according to claim 1 wherein said speech recognition system uses an acoustic model comprising the plurality of adjustable parameters;
    at least one of the plurality of acoustic differences is matched to a corresponding at least one of the plurality of adjustable parameters, and
    wherein performing compensated speech recognition comprises adjusting the acoustic model by varying the at least one of the plurality of adjustable parameters to compensate for the at least one of the plurality of acoustic differences.

6. A method according to claim 5 wherein a variance of the at least one of the plurality of adjustable parameters is a function of a magnitude of the corresponding acoustic difference.

7. A method according to claim 5 wherein the at least one of the plurality of adjustable parameters comprises a weight indicating the relative importance of the corresponding at least one of the plurality of acoustic differences.

8. A method according to claim 1 wherein compensated speech recognition is performed on the utterance with the higher confidence value.

9. A method according to claim 1 wherein compensated speech recognition is performed on only the second user utterance.

10. A speech recognition system comprising:
A processor executing an application for:
prompting a user to speak a first utterance, the first utterance comprising at least one phrase;
in response to a determination that a first confidence value representing an expected accuracy of a speech recognition operation on the first utterance is less than a threshold value, prompting the user to speak a second utterance, wherein the second utterance comprises the at least one phrase associated with the first utterance; and
recording the first and second utterances;
a difference engine for processing the first and second utterances to identify a plurality of acoustic differences between first and second utterances;
a speech recognition engine for:
performing speech recognition on the first utterance and generating a first recognition result, wherein the first recognition result comprises the first confidence value; and
performing speech recognition on the second utterance and generating a second recognition result, wherein the second recognition result comprises a second confidence value
a compensation controller for compensating the speech recognition system by adjusting a plurality of adjustable parameters to compensate for the plurality of acoustic differences;
wherein the speech recognition engine further processes the first and/or the second user utterances by performing compensated speech recognition of the first and/or the second user utterances, wherein the performing compensated speech recognition comprises:
performing speech recognition on a selected one of the first user utterance and the second user utterance and generating a compensated speech recognition result for the selected utterance using the compensated speech recognition system, wherein the first user utterance is selected when the first confidence value is higher than the second confidence value, and wherein the second user utterance is selected when the second confidence value is higher than the first confidence value; or
performing speech recognition on the first user utterance to generate a first compensated result having a first compensated confidence value using the compensated speech recognition system, performing speech recognition on the second user utterance to generate a second compensated result having a second compensated confidence value using the compensated speech recognition system, selecting the first compensated result as the compensated speech recognition result when the first compensated confidence value is greater than the second compensated confidence value, and selecting the second compensated result as the compensated speech recognition result when the second compensated confidence value is greater than the first compensated confidence value.

11. A system according to claim 10 wherein:
said speech recognition engine comprises an acoustic model with the plurality of adjustable parameters;
the difference engine matches the at least one of the plurality of acoustic differences to a matched adjustable parameter of the plurality of adjustable parameters; and
the compensation controller adjusts the acoustic model by varying the matched adjustable parameter to reflect the at least one of the plurality of acoustic differences.

12. A system according to claim 11 wherein the speech recognition system is programmed to perform compensated speech recognition on the utterance with the higher confidence value.

13. A system according to claim 11 wherein the speech recognition system is programmed to perform compensated speech recognition on both the first user utterance, resulting in a first compensated recognition result comprising a first confidence score, and the second user utterance, resulting in a second compensated recognition result comprising a second confidence score, and the compensated recognition result with the best confidence score is used.

14. A speech recognition system according to claim 11 wherein the compensation controller varies the matched adjustable parameter as a function of a magnitude of the corresponding at least one of the plurality of acoustic differences.

15. A computer program product comprising a non-transitory computer readable recording medium having computer readable code stored thereon, said computer readable code when executed on a computer system causes the computer system to perform a voice recognition method comprising acts of:
prompting a user to provide a first utterance comprising a phrase;
recording a first user utterance;
performing speech recognition on the first user utterance and generating a first recognition result using a speech recognition system, wherein the first recognition result comprises a first confidence value that represents an expected accuracy of the speech recognition on the first user utterance;
in response to a determination that the first confidence value is less than a threshold value, re-prompting the user to provide a second utterance comprising the same phrase as the first utterance;
recording the second user utterance uttered in response to the re-prompting;
performing speech recognition on the second user utterance and generating a second recognition result using the speech recognition system, wherein the second recognition result comprises a second confidence value that represents an expected accuracy of the speech recognition on the second user utterance;
in response to a determination that the second confidence value is less than a threshold value, detecting a plurality of acoustic differences between the first and second user utterances;
modifying, by compensating, the speech recognition system by adjusting a plurality of adjustable parameters to compensate for the plurality of acoustic differences; and
performing compensated speech recognition on the first and/or the second user utterances, wherein the performing compensated speech recognition comprises:
performing speech recognition on a selected one of the first user utterance and the second user utterance and generating a compensated speech recognition result for the selected utterance using the compensated speech recognition system, wherein the first user utterance is selected when the first confidence value is higher than the second confidence value, and wherein the second user utterance is selected when the second confidence value is higher than the first confidence value; or performing speech recognition on the first user utterance to generate a first compensated result having a first compensated confidence value using the compensated speech recognition system, performing speech recognition on the second user utterance to generate a second compensated result having a second compensated confidence value using the compensated speech recognition system, selecting the first compensated result as the compensated speech recognition result when the first compensated confidence value is greater than the second compensated confidence value, and selecting the second compensated result as the compensated speech recognition result when the second compensated confidence value is greater than the first compensated confidence value.

16. A computer program product according to claim 15 wherein said speech recognition system uses an acoustic model comprising the plurality of adjustable parameters;

at least one of the plurality of acoustic differences is matched to a corresponding at least one of the plurality of adjustable parameters, and wherein performing compensated speech recognition comprises adjusting the acoustic model by varying the at least one of the plurality of adjustable parameters to compensate for the at least one of the plurality of acoustic differences.

17. A computer program product according to claim 16 wherein a variance of the at least one of the plurality of adjustable parameters is a function of a magnitude of the corresponding acoustic difference.

18. A computer product according to claim 15 wherein performing modified speech recognition comprises using the modified speech recognition process on the utterance with the higher confidence value.

19. A computer product according to claim 15 wherein performing modified speech recognition comprises using the modified speech recognition process on the second utterance.

* * * * *